US006171701B1

(12) United States Patent
Moore

(10) Patent No.: US 6,171,701 B1
(45) Date of Patent: Jan. 9, 2001

(54) PYROLYTIC GRAPHITE MONOCROMATOR AND METHOD FOR IMPROVING LATTICE SPACING SPREAD OF A PYROLYTIC GRAPHITE MONOCROMATOR

(75) Inventor: Arthur William Moore, Strongsville, OH (US)

(73) Assignee: Advanced Ceramics Corporation, Lakewood, OH (US)

( * ) Notice: Under 35 U.S.C. 154(b), the term of this patent shall be extended for 0 days.

(21) Appl. No.: 09/386,739

(22) Filed: Aug. 31, 1999

(51) Int. Cl.[7] ........................................ B32B 9/00

(52) U.S. Cl. ........................ 428/408; 428/212; 428/408; 428/688; 423/448

(58) Field of Search ........................ 428/212, 408, 428/688; 423/448

(56) References Cited

U.S. PATENT DOCUMENTS 5,798,075 * 8/1998 Moore .............................. 264/320

* cited by examiner

*Primary Examiner*—Deborah Jones
*Assistant Examiner*—Lymarie Miranda
(74) *Attorney, Agent, or Firm*—Anderson, Kill & Olick

(57) ABSTRACT

In accordance with the present invention at least two different grades of HOPG material with different d-spacings are combined to form a composite HOPG monochromator with increased spacing spread (Δd/d) defined by the combination of the two HOPG materials with each HOPG material oriented relative to one another so that their layer planes are parallel. The increased Δd/d should yield higher neutron beam intensities in certain types of backscattering instruments.

2 Claims, 2 Drawing Sheets d-spacing variation & neutron mosaic spread from two types of HOPG - separate & combined

Effective neutron mosaic spread at 4.42A (Degrees)
A = 4 layers each of Type 1 and Type 2
B = 1 layer of Type 1 and 2 layers of Type 2

Fig. 1. Peak reflectivity and neutron mosaic spread from two types of HOPG.
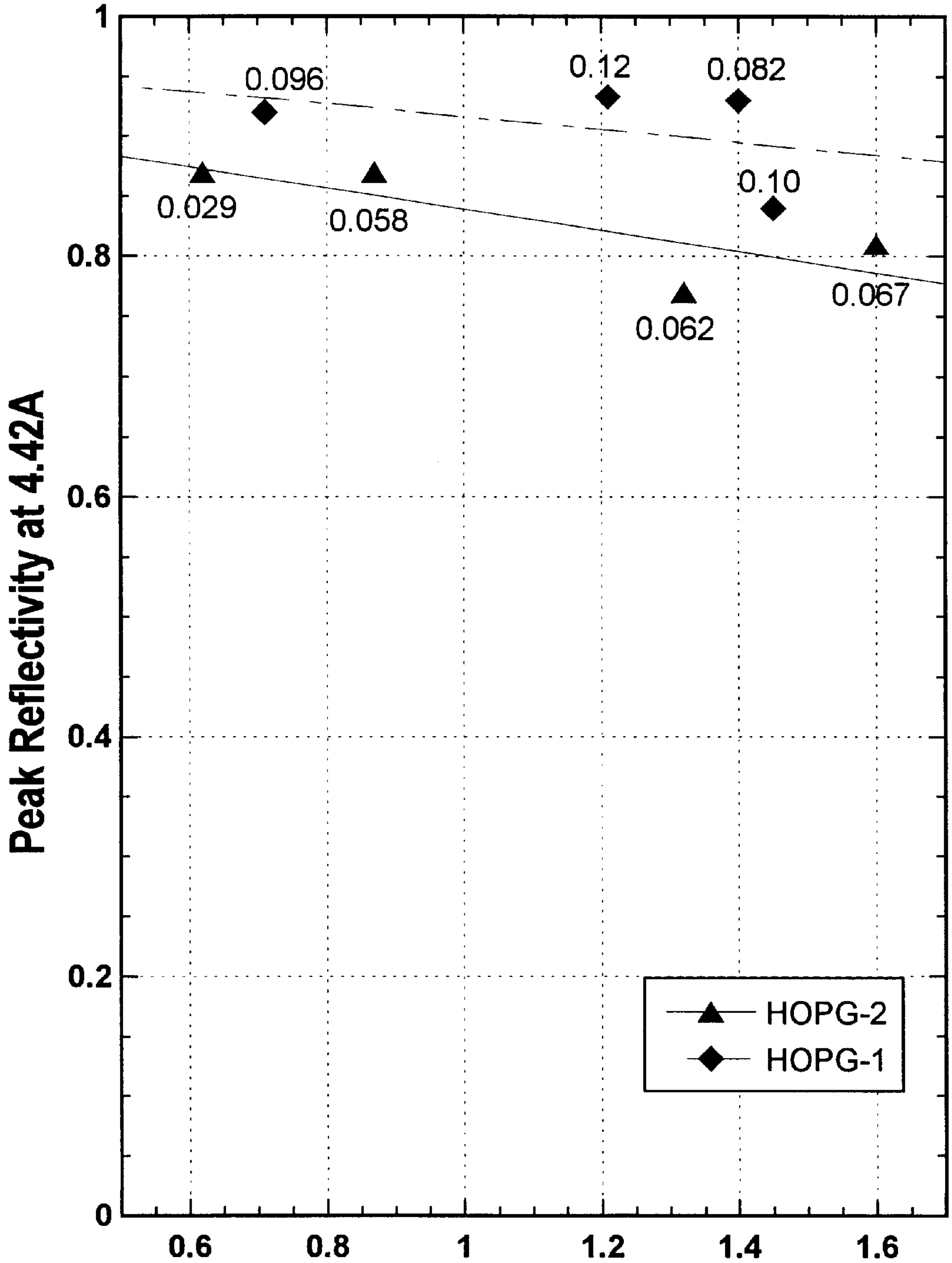
Effective Neutron Mosaic Spread (Degrees)
Numbers on points = % variation of d-spacing

Figure 2. d-spacing variation & neutron mosaic spread from two types of HOPG - separate & combined
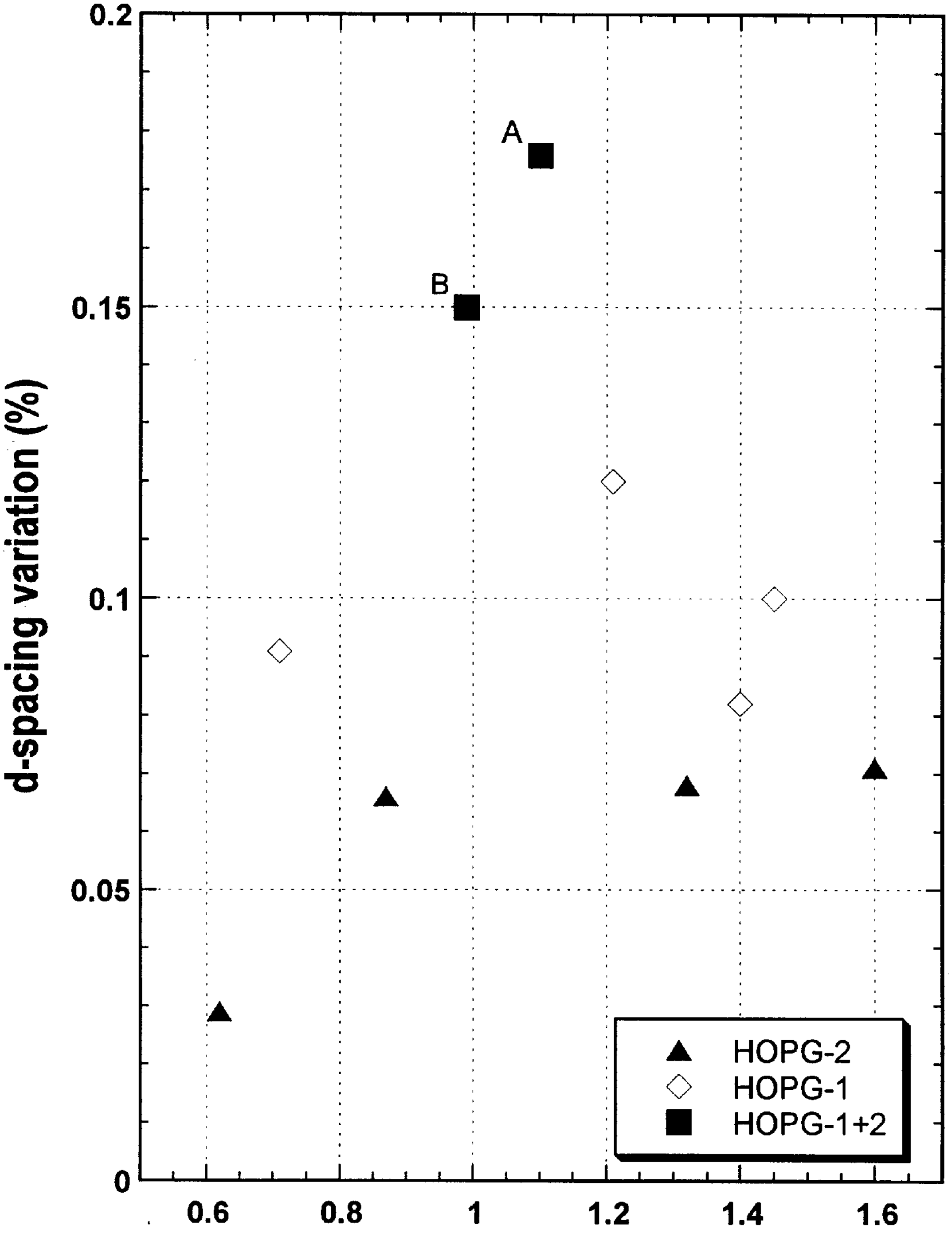
Effective neutron mosaic spread at 4.42A (Degrees)
A = 4 layers each of Type 1 and Type 2
B = 1 layer of Type 1 and 2 layers of Type 2

PYROLYTIC GRAPHITE MONOCROMATOR AND METHOD FOR IMPROVING LATTICE SPACING SPREAD OF A PYROLYTIC GRAPHITE MONOCROMATOR

FIELD OF THE INVENTION

This invention relates to pyrolytic graphite monochromators and more particularly to a highly oriented pyrolytic graphite ("HOPG") monochromator and method for increasing the d-spacing spread of a HOPG monochromator.

BACKGROUND OF THE INVENTION

Graphite monochromaters are highly oriented forms of high purity pyrolytic graphite which diffract x-rays and neutrons to generate a monochromatic beam of x-rays and/or neutrons for use in a spectrometer for measuring the characteristics of crystalline materials.

Graphite monochromaters are classified according to their neutron mosaic spread characteristic. Each known type of HOPG material will exhibit a different lattice spacing known to those skilled in the art as "d-spacing" for each effective neutron mosaic spread. The neutron reflectivity of graphite monochromaters should be high for application in neutron scattering instruments. At high Bragg angles, near 90°, the diffracted beam intensity is determined by the lattice spacing spread i.e. the d-spacing spread of the HOPG material in the monochromater. HOPG has a natural d-spacing spread which is large enough for high luminosity in back-reflection arrangements. Methods for further increasing this d-spacing spread would be of great value in providing increased neutron flux in backscattering instruments.

The mosaic spread is a measurement of the full width at half maximum intensity of the reflection of an x-ray beam from a sample of HOPG material when rotated through the Bragg angle to generate an x-ray diffraction curve known as a "rocking curve". The rocking curve is a graph of the intensity of the reflected x-rays as a function of the angular distance from a reference plane using Bragg's Law to determine the angular deviation. This calculation is made for each HOPG sample to permit its mosaic spread range to be measured so that each sample can be categorized into different standard mosaic spread ranges. U.S. Pat. No. 5,798,075, the disclosure of which is herein incorporated by reference, teaches how to assure a yield of up to 100% of HOPG material having a mosaic spread tailored to any desired preselected narrow range starting from HOPG processed material having a mosaic spread below the desired final mosaic spread specification for the material.

The present invention provides a method for increasing the effective d-spacing spread of an HOPG graphite monochromator by combining two or more conventional types of HOPG materials to form a composite HOPG structure formed of layers of separate HOPG materials each having a different average d-spacing and oriented with their layer planes parallel to one another. For example, an arbitarily selected HOPG grade or type material defined, for purposes of the present invention, as a Type 1 HOPG material, showed a higher average interlayer spacing and a greater lattice spacing spread i.e. d-spacing spread over the same mosaic range relative to a second more ordered HOPG graphite material arbitrarily defined as a Type 2 HOPG material to distinguish the two from each other. In neutron reflectivity measurements at 4.42 Å, the peak reflectivity of the more disordered type 1 HOPG material was found to be 5–10% higher than that of the more ordered grade Type 2 HOPG material, and the average interlayer spacing was ~0.003 Å higher. The d-spacing spreads of the more disordered HOPG grade were 0.08–12% and those of the more ordered grade were 0.03–0.07%. It was discovered in accordance with the present invention that by combining the two different grades of HOPG material to form a composite HOPG structure defined by the combination of the two different grades of HOPG material with each oriented relative to one another so that their layer planes were parallel that the effective d-spacing spread would increase to 0.15–0.18%. The increased Δd/d should yield higher neutron beam intensities in certain types of backscattering instruments.

SUMMARY OF THE INVENTION

The method of the present invention comprises the steps of selecting two or more HOPG materials each having different average spacings over the same effective neutron mosaic spread range and combining the two or more HOPG materials to form a composite HOPG monochromator structure defined by the combination of the two or more HOPG materials oriented with their layer planes parallel to one another. An HOPG graphite monochromator in accordance with the present invention comprises at least two HOPG materials each having a different average d-spacing in an arrangement with the HOPG materials stacked upon one another to form a composite structure having their layer planes in an orientation parallel to one another.

BRIEF DESCRIPTION OF THE DRAWINGS

The advantages of the present invention will become apparent from the following detailed description when read in conjunction with the accompanying drawings of which:

FIG. 1 is a graph of peak reflectivity and neutron mosaic spread for two arbitrary types of HOPG materials; and FIG. 2 is a graph of the d-spacing variation over the same neutron mosaic spread range for the two arbitrary types of HOPG material used in FIG. 1.

DETAILED DESCRIPTION OF THE INVENTION

Graphite is made up of layer planes of hexagonal arrays or networks of carbon atoms. These layer planes of hexagonally arranged carbon atoms are substantially flat and are oriented so as to be substantially parallel and equidistant to one another. The substantially flat parallel layers of carbon atoms are referred to as basal planes and are linked or bonded together in groups arranged in crystallites. Conventional or electrolytic graphite has a random orientation to the crystallites. Highly ordered graphite has a high degree of preferred crystallite orientation. Accordingly, graphite may be characterized as laminated structures of carbon atoms having two principal axes, to wit, the "c" axes which is generally identified as the axes or direction perpendicular to the carbon layers and the "a" axes or direction parallel to the carbon layers and transverse to the c axes. Graphite materials which exhibit a high degree of orientation include natural graphite and synthetic or pyrolytic graphite. Pyrolytic graphite is produced by the pyrolysis of a carbonaceous gas on a suitable substrate at elevated temperature. Briefly, the pyrolytic deposition process may be carried out in a heated furnace heated to above 1500° C. and up to 2500° C. and at a suitable pressure, wherein a hydrocarbon gas such as methane, natural gas, acetylene etc. is introduced into the heated furnace and is thermally decomposed at the surface of a substrate of suitable composition such as graphite having any desirable shape. The substrate may be removed or separated from the pyrolytic graphite. The pyrolytic graphite may then be further subjected to thermal annealing at high temperatures to form a highly oriented pyrolytic graphite commonly referred to as "HOPG" or "TPG" material. Highly oriented pyrolytic graphite (HOPG) for purposes of the present invention shall mean pyrolytic graphite which has been annealed at high temperature. Different grades or types of HOPG material can be readily formed at different annealing temperatures preferably at close to or above 3000° C. The HOPG grade materials are conventionally produced as flat plates, singly-bent and doubly-bent shapes. The structure and preferred orientation of the HOPG plates are determined by x-ray diffraction. In accordance with the present invention two or more different HOPG grade materials are selected having different d-spacings and combined to form a composite structure with the basal planes of each material oriented in parallel to one another. The composite structure may simply represent two flat plate HOPG materials stacked upon one another.

The high reflectivity of graphite monochromators is of great value for applications in many neutron scattering instruments. At high Bragg angles, the diffracted beam intensity is strongly influenced by the d-spacing variation of the HOPG material in the monochromator. HOPG has a natural d-spacing spread which is large enough for high luminosity in backreflection arrangements. Recent applications describe analyzers for backscattering instruments at pulsed sources.

Experimental Conditions

Neutron reflectivity measurements were made on plates of size 25×20×2 mm cut from two different types of HOPG materials herein arbitrarily designated as Type 1 HOPG and Type 2 HOPG respectively. The Type 1 HOPG showed a higher average interlayer spacing and a greater lattice spacing variation than the more ordered Type 2 HOPG material. Three types of measurements were done on all of the samples: Reflection rocking curves with wide detector window, transmission rocking curves at small angular divergence, and $\theta$–$2\theta$ scans at very high resolution.

The experimental arrangement consisted of a bent perfect Si (111) monochromator at near 90 degrees take-off angle (wavelength 4.42 Å), a narrow slit (0.2 mm) before the sample (at 3 cm distance), and cooled Be or Si filters. The monochromator radius (4.76 m) was optimal for good resolution in powder diffraction at the detector angle corresponding to the (002) reflection of HOPG. Reflection and transmission rocking curves were measured with a Be-filtered clean beam. The reflection curves were measured using a wide opening at the detector. The transmission curves were measured with a 0.7 mm slit 24.5 cm after the sample giving an angular divergence below 0.1 degrees. For the $\theta$–$2\theta$ scans, an angular resolution of one minute of arc was achieved by placing a narrow slit (0.2 mm) in front of the detector. The transmission and reflection rocking curve data were fitted with Gaussian curves and the $\theta$–$2\theta$ scans with Voigt functions. For $\theta$–$2\theta$ scans, a correction for the instrumental resolution was made by subtracting a Gaussian contribution of 0.0183 degrees from the Gaussian component of the Voigt function. The width of the distribution of d-spacing (represented by $\Delta d/d$) is related to the angular width of the $\theta$–$2\theta$ scan $\Delta\theta$ through the relation $\Delta d/d = \cot \Delta\theta$.

EXAMPLE 1

Four layers each of Type 1 and Type 2 HOPG (each 0.25 mm thick) were stacked alternately to obtain a 2-mm thick sandwich consisting of alternating layers of the two types of HOPG. The neutron mosaic spread at wavelength 4.42 Å was 1.1° for both types. The d-spacing spread ($\Delta d/d$) of the Type 1 HOPG was 0.11%. The $\Delta d/d$ of the Type 2 HOPG was 0.07%. The effective $\Delta d/d$ of the combined types (composite) was 0.18% which is a 64% increase over the $\Delta d/d$ of the Type 1 HOPG alone.

EXAMPLE 2

One layer of Type 1 HOPG and two layers of Type 2 HOPG (each 0.67 mm thick) were stacked together with the Type 1 HOPG in the center of the stack, to form a 3-piece composite monochromater of 2.0 mm total thickness. The neutron mosaic spread at 4.42 Å was 1.0° for both types. The effective $\Delta d/d$ of the combined types in combination was 0.15% which is a 35% increase over the $\Delta d/d$ of the Type 1 HOPG alone.

Results

FIG. 1 shows the relation between peak reflectivity and effective neutron mosaic spread at 4.42 Å for the two types of HOPG. The peak reflectivity decreases slightly with effective mosaic spread over the range 0.6–1.60°. Over this range, the more disordered Type 1 HOPG shows 5–10% higher reflectivity than the more ordered Type 2 HOPG. The numbers written at the data points also show that the d-spacing variation in Type 1 HOPG is higher than in the Type 2 HOPG samples.

The d-spacing variation for Type 1 and Type 2 HOPG is plotted against effective neutron mosaic spread in FIG. 2. This figure also gives results for two composite monochromators (of total thickness 2 mm) made by combining Type 1 and Type 2 HOPG pieces of equal thickness and mosaic spread. The $\Delta d/d$ values for the alternating components of an eight-piece sandwich were 0.11% for Type 1 and 0.07% for Type 2. The peak widths and separations yielded an effective $\Delta d/d$ of 0.18% for this sandwich. The increased $\Delta d/d$ obtained with the combined HOPG types should make it possible to obtain higher neutron intensity in certain types of backscattering instruments.

What I claim is:

1. A method for increasing the effective d-spacing spread of an HOPG graphite monochromator comprising the steps of combining two or more HOPG materials each having a different average d-spacing to form a composite HOPG structure with the separate HOPG materials oriented with their layer planes parallel to one another.

2. An HOPG graphite monochromator comprising at least two HOPG materials each having a different average d-spacing in an arrangement with the HOPG materials stacked upon one another to form a composite structure having their layer planes in an orientation parallel to one another.

* * * * *